United States Patent [19]
Rampone et al.

[11] Patent Number: 6,020,751
[45] Date of Patent: Feb. 1, 2000

[54] METHOD AND APPARATUS FOR STRESS TESTING OF A CIRCUIT BOARD ASSEMBLY

[75] Inventors: Thomas A. Rampone, Hillsboro; Jerald N. Hall, Scappoose, both of Oreg.

[73] Assignee: Intel Corporation, Santa Clara, Calif.

[21] Appl. No.: 08/778,291

[22] Filed: Jan. 2, 1997

[51] Int. Cl.[7] .................................................. G01R 31/26
[52] U.S. Cl. ........................................................ 324/765
[58] Field of Search ................................ 324/765, 158.1; 714/29, 745, 814

[56] References Cited

U.S. PATENT DOCUMENTS

| | | | |
|---|---|---|---|
| 4,430,735 | 2/1984 | Catiller | 714/745 |
| 5,583,875 | 12/1996 | Weiss | 714/29 |
| 5,796,751 | 8/1998 | Kundu | 371/22.3 |

*Primary Examiner*—Josie Ballato
*Assistant Examiner*—Russell M. Kobert
*Attorney, Agent, or Firm*—Blakely, Sokoloff, Taylor & Zafman LLP

[57] ABSTRACT

A method and apparatus for testing a circuit board is disclosed. An apparatus having at least one clock source for providing a circuit board with a clock signal at a dynamically selected frequency, a storage medium storing programming instructions to control the clock source(s) to provide the clock signal at the dynamically selected frequency including a frequency that exceeds the specified operating range of frequencies for the circuit board, and for implementing parametric testing of the circuit board, and an execution unit coupled to the clock source and to the storage medium for executing the programming instructions. The programming instructions for implementing the parametric testing of the circuit board include instructions for testing the circuit board while the circuit board is supplied with the clock signal at the frequency that exceeds the operating frequency of the circuit board, thereby stressing the circuit board. The programming instructions cause the one or more clock sources to gradually increase the dynamically selected clock signal frequency to the frequency that exceeds the operating frequency of the circuit board.

13 Claims, 3 Drawing Sheets

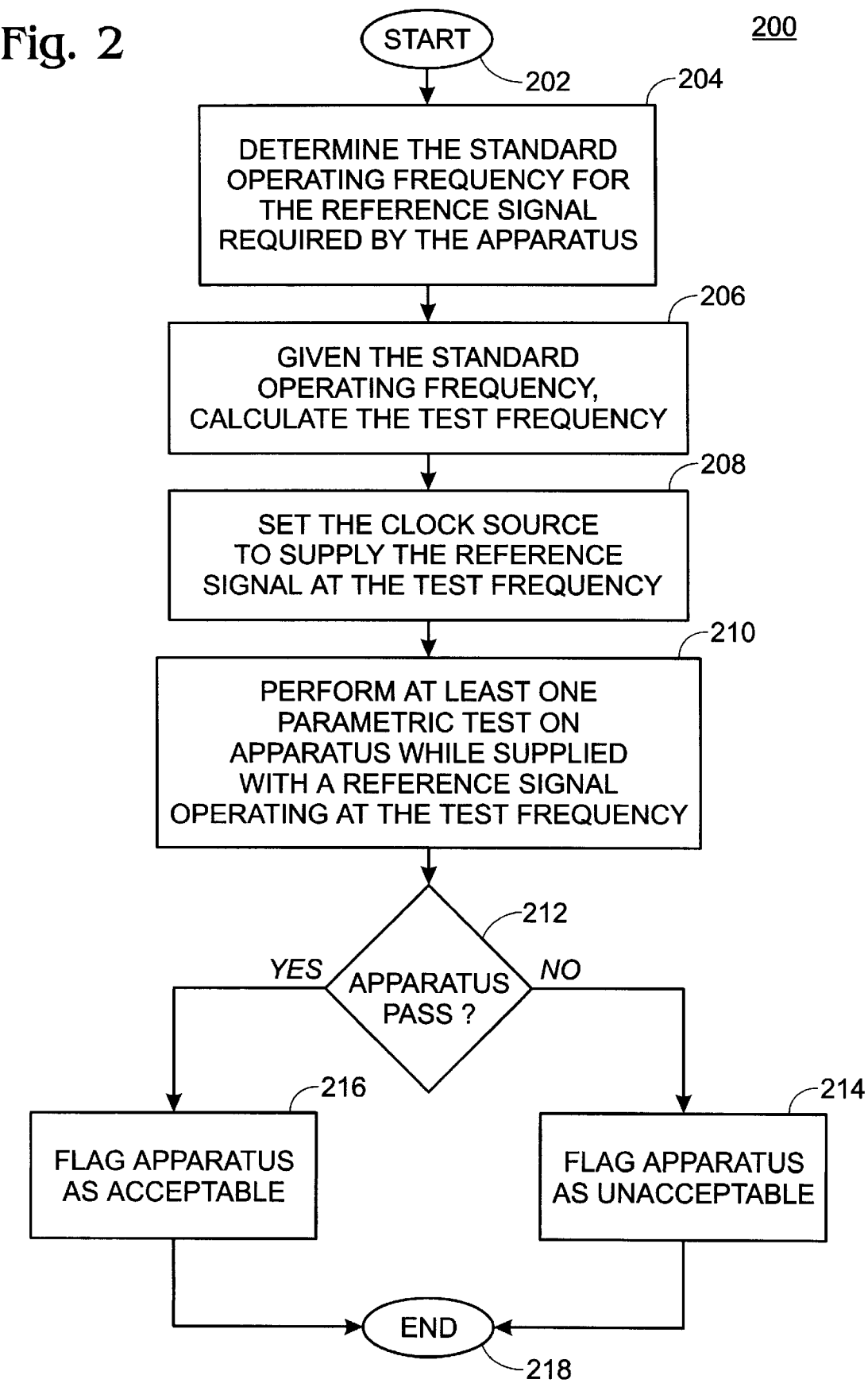

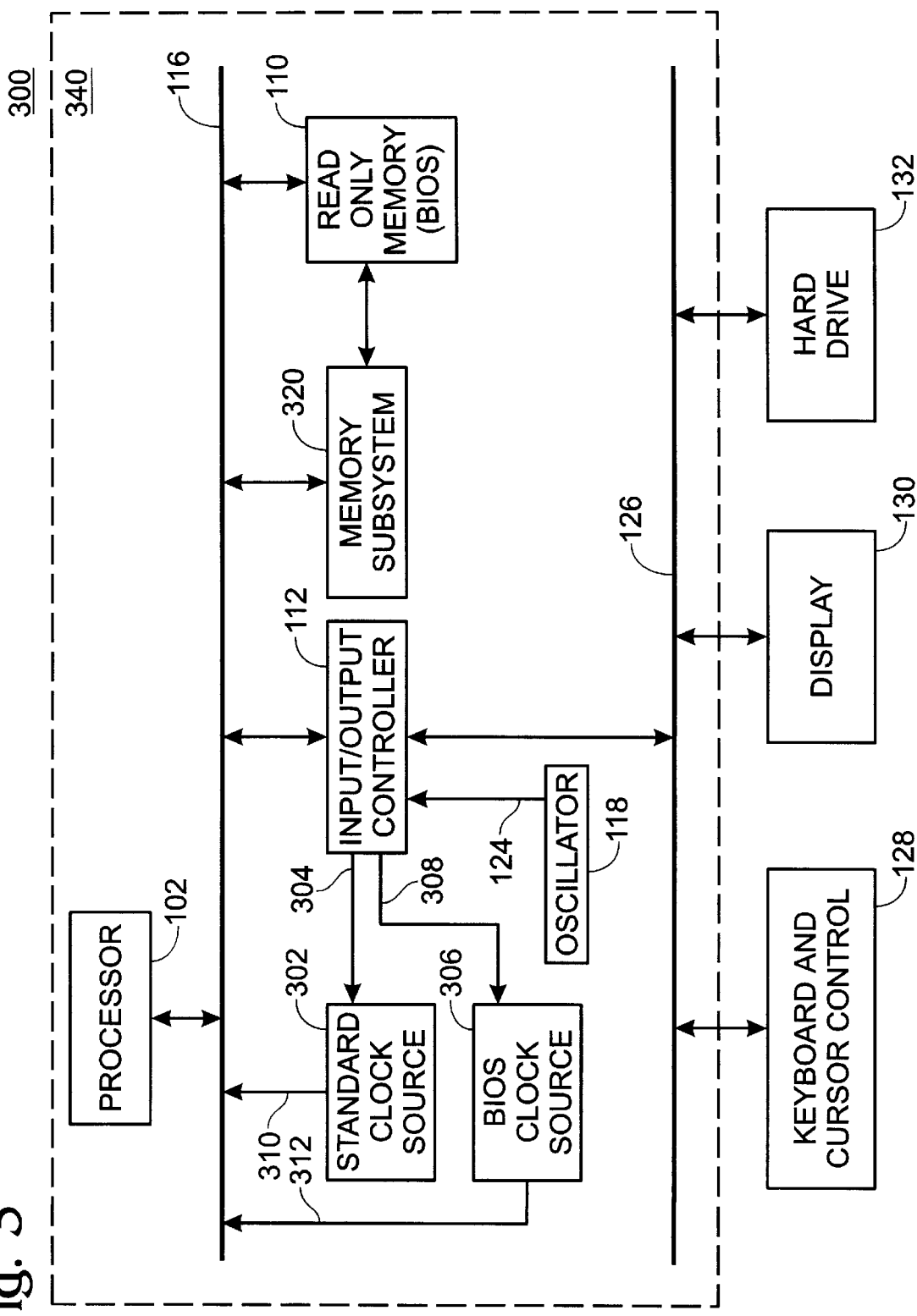

METHOD AND APPARATUS FOR STRESS TESTING OF A CIRCUIT BOARD ASSEMBLY

BACKGROUND OF THE INVENTION

1. Field of the Invention

The present invention relates to the field of computer systems and, in particular, to a method and apparatus for stress testing of a circuit board assembly.

2. Background Information

Manufacturers have long understood that manufacturing processes are not perfect. Manufacturers of printed circuit board assemblies (PCBs), for example, understand that the manufacturing processes used to manufacture PCBs are unable to produce a population of product which performs exactly the same. Therefore, manufacturers determine performance specification limits for each critical operating parameter of a product, generally drawn around an optimum performance level for each critical parameter. For example, the operating frequency of a clock source may be specified at 66 MHz, with a "specification window" of plus or minus 2 MHz. Thus, a clock source that performs within the range of 64–68 MHz will be identified as "acceptable" (or "passing"), while those not performing within this range will be identified as "unacceptable" (or "failing"). The purpose of the specification window is to ensure the proper performance of the PCB assembly when integrated into larger systems, and under the operating conditions of the end-user environment.

Nonetheless, despite this "weeding out" of unacceptable product through the parametric testing which occurs during the manufacturing process, there remains a percentage of the "acceptable" population of product that fails to meet performance specifications when subjected to the actual operating conditions of the end-user environment. One explanation for the variability in performance of the printed circuit board assembly may be attributed to the variability in the components of the PCB. Thus, if a product just barely falls within the specification window for a particular operating parameter, i.e. the product is marginally acceptable, it may well be that under certain operating conditions the product may fail to meet the operating specification.

Consequently, one of the issues faced by manufacturers is how to identify and thus contain the marginally performing population of products produced by the manufacturing process that will fail under the conditions of the end-user operating environment. One prior art solution to this problem is to simply tighten the specification window. This is a very costly solution, however, in that not all of the products tested to perform near the edge of the specification window will actually result in a field failure.

Another prior art solution to the problem is subjecting the population of product, or a sample thereof, to environmental stress testing. Environmental stress testing, as its name implies, subjects the circuit board assembly to a number of environmental stresses such as temperature (both hot and cold), humidity, and shock/vibration testing.

Environmental stress testing, however, has the limitation that it employs a mechanical delivery mechanism. That is, environmental testing applies the stress to the electronic device externally, through the packaging of the devices. The packaging of electronic devices has a property commonly referred to as a "thermal coefficient" which describes the rate at which heat is transferred through the packaging material. Without going into unnecessary details, it is sufficient to say that environmental stress testing incurs a time delay, necessary to allow the inner circuitry of the electronic devices to settle into a steady state operating temperature, before the parametric testing may be completed. Accordingly, environmental testing is also considered a costly solution, both in terms of the time required to complete the testing sequence, as well as the capital equipment associated with conducting such tests (i.e., temperature chambers, humidity chambers, shock/vibration chambers). Therefore, despite manufacturers effort to identify and contain marginally performing printed circuit board assemblies, the prior art solutions have not proven to be effective.

Thus a need exists for a more cost effective method and apparatus for stress testing of a circuit board assembly that is unencumbered by the deficiencies and limitations associated with the prior art.

SUMMARY OF THE INVENTION

In accordance with the teachings of the present invention, a method and apparatus for stress testing of a circuit board assembly is disclosed. As described in accordance with one embodiment of the present invention, an apparatus comprising at least one clock source for providing the apparatus with a clock signal at a dynamically selected frequency, a storage medium having stored therein a plurality of programming instructions for controlling the at least one clock source to provide the clock signal at the dynamically selected frequency including a frequency that exceeds an operating frequency specification for the apparatus, and for implementing parametric testing of the apparatus, and an execution unit, coupled to the clock source and the storage medium, for executing the programming instructions is disclosed. In particular, the programming instructions for implementing parametric testing of the apparatus include instructions for testing the apparatus while the apparatus is supplied with the clock signal at the frequency that exceeds the operating frequency specification of the apparatus, thereby stressing the apparatus.

BRIEF DESCRIPTION OF THE DRAWINGS

The present invention will be described by way of exemplary embodiments, but not limitations, illustrated in the accompanying drawings in which like references denote similar elements, and in which:

FIG. 2 is a flow chart illustrating a method for stress testing of a circuit board assembly incorporating the teachings of the present invention; and FIG. 3 is a block diagram illustrating an exemplary computer system incorporating the teachings of the present invention, in accordance with another embodiment of the present invention.

DETAILED DESCRIPTION

Figure 1:
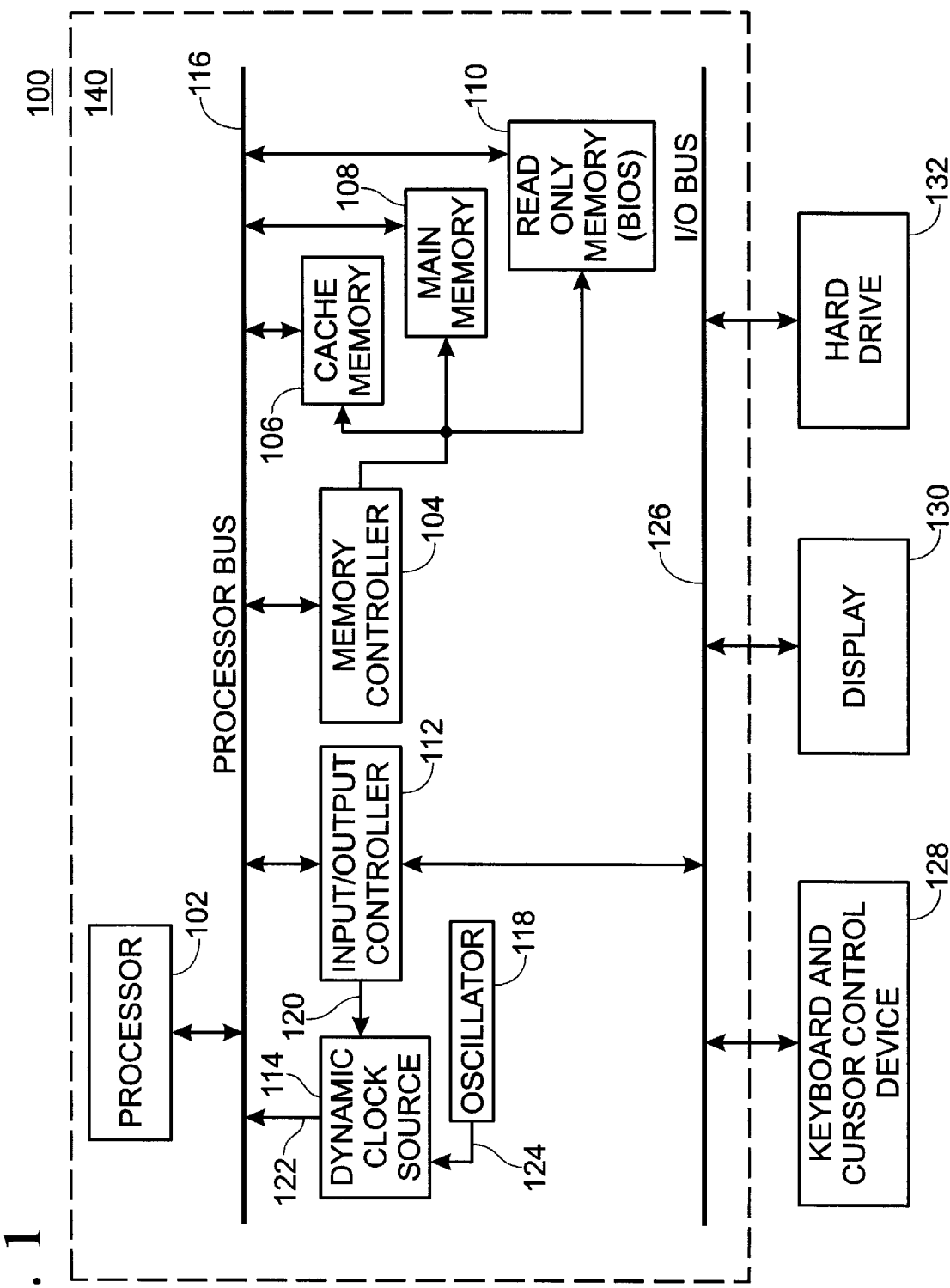
FIG. 1 is a block diagram illustrating an exemplary computer system incorporating the teachings of the present invention, in accordance with one embodiment of the present invention.

In the following description, for purposes of explanation, specific numbers, materials and configurations are set forth in order to provide a thorough understanding of the present invention. However, it will be apparent to one skilled in the art that the present invention may be practiced without the specific details, In other instances, well known features are omitted or simplified in order not to obscure the present invention. Furthermore, for ease of understanding, certain method steps are delineated as separate steps, however, these separately delineated steps should not be construed as necessarily order dependent in their performance.

Referring now to FIG. 1, a block diagram illustrating an exemplary computer system 100 is depicted, where, in accordance with one embodiment of the present invention, exemplary computer system 100 is configured to test circuit board assembly 140 to determine whether circuit board assembly 140 is acceptable. As illustrated in FIG. 1, exemplary computer system 100 is comprised of processor 102, memory controller 104, cache memory 106, main memory 108, read-only memory 110 and input/output controller 112 each coupled to processor bus 116 on circuit board assembly 140. In addition, input/output controller 112 is coupled to dynamic clock source 114 incorporating the teachings of the present invention, as well as to input/output (I/O) bus 126. Dynamic clock source 114 is coupled to oscillator 118. As illustrated, I/O controller 112 is coupled to keyboard and cursor control device 128, display 130 and hard drive 132 via I/O bus 126.

As illustrated, I/O controller 112 is controlled by processor 102 via processor bus 116. I/O controller 112, in turn, allows processor 102 to interface with the peripherals coupled to I/O bus 126, such as, for example, hard drive 132, display 130 and keyboard and cursor control device 128. In addition, as will be described in more detail below, processor 102 controls the output of dynamic clock source 114 via I/O controller 112.

Except for the manner in which the elements are used to perform stress testing of circuit board assembly 140, elements 102–132 perform their respective conventional function as known in the art, and may be implemented in any of a number of conventional techniques known to those skilled in the art. In fact, exemplary computer system 100 is intended to represent a broad category of computer systems.

Read-only memory 110 includes a system basic input/output operating system (BIOS) having start-up processes which may, in one embodiment, include programming instructions for testing circuit board assembly 140 using a method described in more detail below with reference to FIG. 2. In addition to the system BIOS, read-only memory 110 may also store system configuration information (not illustrated). The system configuration information may contain such information as processor speed, bus/core ratio, and the grade or access times associated with the memory modules 106, 108 and 110. However, the system configuration information need not be stored in read-only memory 110, but may alternatively be available on hard drive 132 or an alternative storage medium.

The operation of exemplary computer system 100 will be described with continued reference to FIG. 1 and further reference to FIG. 2, which depicts a method for stress testing of a circuit board assembly incorporating the teachings of the present invention. As illustrated in FIG. 2, testing begins when, in step 202, a plurality of programming instructions resident on hard drive 132 or, in an alternate embodiment, in ROM 110 is initiated. As the process begins, processor 102 determines the standard operating frequency and operating frequency specification for the clock signal required by circuit board assembly 140, in step 204. The determination of the operating frequency of the clock signal for circuit board assembly 140 may be made by, for example, accessing the system configuration information stored in ROM 110, determining the setting of a strapping option (i.e., a jumper) (not shown) that corresponds to clock speed, or any number of suitable methods.

From the standard operating frequency of the clock signal for circuit board assembly 140 determined in step 204, a testing frequency is calculated in step 206. The testing frequency is calculated so as to exceed the operating frequency specification for circuit board assembly 140 by a predetermined value. In one embodiment of the invention, for example, the testing frequency is set to exceed the operating frequency specification for circuit board assembly 140 by five percent (5%). Thus, in this example, if the standard operating frequency of the clock signal is 60 MHz, the testing frequency calculated would be 63 MHz.

Therefore, in accordance with the teachings of the present invention, dynamic clock source 114 is preferably a variable clock source, capable of generating a clock signal for circuit board assembly 140 at both a standard operating frequency as well as at a testing frequency that exceeds the operating frequency specification of the clock signal for circuit board assembly 140. An additional requirement of dynamic clock source 114 is that the transition of the clock signal between the standard operating frequency and the testing frequency be gradual so as to not "lock-up" the phase lock loops (PLL) associated with the processor(s) coupled to processor bus 116, e.g., processor 102. One example of a suitable clock source is the "ICS9169-03 Clock Generator and Buffer for Pentium® and PentiumPro Processor®" clock source, commonly available from Integrated Circuit Systems, Inc. of San Jose, Calif. One skilled in the art, however, will recognize that other suitable clock sources may be used without departing from the spirit and scope of the invention.

Having calculated the testing frequency in step 206, processor 102 configures dynamic clock source 114 to supply the clock signal to processor bus 116 at the testing frequency. In particular, processor 102 selects the input required by dynamic clock source 114 and instructs I/O controller 112 to supply the requisite input to dynamic clock source 114 via general purpose output lines 120. In response, dynamic clock source 114 gradually transitions the clock signal supplied to processor bus 116 to the requested testing frequency. For example, in one embodiment, dynamic clock source 114 transitions the clock signal from the standard operating frequency to the calculated testing frequency that exceeds the operating frequency specification of circuit board assembly 140 at a rate of one-percent per clock cycle (1%/clock cycle). Consequently, the transition from the standard frequency to the testing frequency requires 100 clock cycles. Therefore, in accordance with this example, for a circuit board assembly with a standard operating frequency of 60 MHz, wherein one clock cycle lasts 16.67 nanoseconds, it will take approximately 1.67 microseconds to complete the transition to the testing frequency.

In addition to the configuration information received from processor 102 through I/O controller 112, dynamic clock source 114 also receives a reference signal from oscillator 118 via line 124. Oscillator 118 provides the reference signal necessary for the phase locked loop(s) (not shown) of dynamic clock source 118 to generate the clock signal at both the standard operating frequency and at the testing frequency. The clock signal is supplied to processor bus 116 via line 122.

Once clock source 114 has completed the gradual transition of the clock signal from the standard operating frequency to the testing frequency in step 208, processor 102 performs at least one parametric test designed to determine whether circuit board assembly 140 has adequate design margin to ensure proper performance in the end-user environment when incorporated into exemplary computer system 100. The parametric testing is designed to test the integrity and interaction of all of the agents coupled to processor bus 116 including, for example, processor 102, memory controller 104, the memory subsystem comprised of cache memory 106, main memory 108 and ROM 110 as well as I/O controller 112 (cumulatively referred to as the chipset).

Once the parametric testing of step 210 has been completed, a determination is made as to whether circuit board assembly 140 has passed the parametric test sequence, based on the test results in step 212. If circuit board assembly 140 failed the parametric testing of step 210, it will be labeled as an unacceptable circuit board assembly in step 214, and the process ends in step 218. Alternatively, if circuit board assembly 140 passed the parametric testing of step 210, it will be labeled as an acceptable circuit board assembly in step 216, and the process ends in step 218.

Turning to FIG. 3, a block diagram illustrating an alternate computer system suitable for testing a circuit board assembly in accordance with the teachings of the present invention, is depicted. As shown, computer system 300 is similar to exemplary computer system 100. In particular, processor 102, I/O controller 112, oscillator 118, processor bus 116, the components of memory subsystem 320 including read only memory 110, and the associated peripherals coupled to the I/O bus 126 are common to both systems. The difference, then, between exemplary computer system 100 and computer system 300 is that computer system 300 has replaced dynamic clock source 114 with two static clock sources, represented by standard clock source 302 and testing clock source 306. As depicted, oscillator output 124 is coupled to a general purpose input of I/O controller 112, which, based on instructions received from processor 102, switches the reference signal to either the standard clock source 302 via general purpose output 304, or to the testing clock source 306 via general purpose output 308.

To select a source for the clock signal, processor 102 instructs I/O controller 112 to enable the general purpose output tied to the selected clock source to pass the reference signal from oscillator 118. Thus, during normal operating conditions, processor 102 instructs I/O controller 112 to pass the reference signal from oscillator 118 via general purpose output 304 to standard clock source 302, which outputs a standard frequency clock signal to processor bus 116 via line 310. Alternatively, during testing, processor 102 instructs I/O controller 112 to pass the reference signal to testing clock source 306 via general purpose output 308, so that a testing frequency clock signal is supplied to processor bus 116 via line 312. Therefore, with the exception of dynamic clock source 114, and the corresponding control thereof, the operation of exemplary computer system 100 and exemplary computer system 300 both function to perform the advantageous stress testing of a circuit board assembly.

Therefore, in accordance with the teachings of the present invention, the advantageous stress testing of a circuit board assembly is accomplished by conducting parametric tests on the circuit board assembly which is configured to operate at a frequency which exceeds the operating frequency specification of the circuit board assembly, the result of which is the electrical generation of heat (generated internally as opposed to the external application of heat associated with thermal testing). In addition to the temperature rise, corresponding current and voltage levels associated with the operation of the printed circuit board are also lowered to a level of electrical stress, the cumulative result of which being an effective electrical stress capable of identifying marginally performing printed circuit board assemblies unencumbered by the cost, efficiency and effectiveness deficiencies associated with the prior art. In other words, environmental stress testing is "emulated" through the use of the electrically induced stress of the present invention.

Thus, a method and apparatus for stress testing of a circuit board assembly has been described. While the method and apparatus of the present invention has been described in terms of the above illustrated embodiments, those skilled in the art will recognize that the invention is not limited to the embodiments so described. Thus, the present invention can be practiced with modification and alteration within the spirit and scope of the appended claims. Accordingly, the description is to be regarded as illustrative instead of restrictive on the present invention.

We claim:

1. An apparatus comprising:

a clock source to provide a clock signal at a dynamically selected frequency to one or more components of a circuit board;

a storage medium having stored therein a plurality of programming instructions to control the clock source to provide the clock signal at the dynamically selected frequency including a frequency that exceeds a specified operating frequency for the circuit board, and to implement parametric testing of the circuit board that includes testing while the clock signal is at the frequency that exceeds the specified operating frequency of the circuit board, wherein the dynamically selected frequency is gradually increased from the specified operating frequency to the frequency that exceeds the specified operating frequency of the circuit board; and an execution unit, coupled to the storage medium and the clock source, to execute the programming instructions.

2. The apparatus of claim 1, wherein the clock source comprises a variable clock source.

3. The apparatus of claim 1, wherein the clock source comprises a first clock source for supplying a clock signal at a frequency within an operating frequency specification for the circuit board apparatus, and further comprises a second clock source for supplying a clock signal at a frequency that exceeds the operating frequency specification.

4. The apparatus of claim 1, wherein the parametric testing further comprises testing the apparatus while the apparatus is supplied with a clock signal at a frequency within the operating frequency specification for the apparatus.

5. The apparatus of claim 1, wherein the apparatus comprises a computer system, and wherein the execution unit and the at least one clock source are disposed on a circuit board assembly of the computer system.

6. The apparatus of claim 1, wherein the storage medium comprises a hard disk drive.

7. The apparatus of claim 1, wherein the storage medium comprises a read-only memory (ROM).

8. The apparatus of claim 7, wherein the programming instructions are part of a basic input/output system (BIOS).

9. The apparatus of claim 1, wherein the operating frequency specification for the apparatus is determined by accessing configuration information stored in a read-only memory (ROM).

10. The apparatus of claim 1, wherein the operating frequency specification for the apparatus is determined by detecting a strapping option selecting a standard operating frequency for the apparatus.

11. The apparatus of claim 1, wherein the frequency that exceeds the operating frequency specification for the apparatus is computed by adding a predetermined value to the determined operating frequency specification.

12. A method for stress testing of a circuit board assembly, the method comprising:
(a) supplying the circuit board assembly with a clock signal at a dynamically selected frequency by
determining the operating frequency specification of the circuit board assembly,
computing a frequency that exceeds the operating frequency specification of the circuit board assembly by adding a predetermined value to the determined operating frequency specification, and
controlling at least one clock source to provide the clock signal at the computed frequency as the dynamically selected frequency that exceeds the operating frequency specification of the circuit board assembly by transitioning the clock signal from a standard frequency within the operating frequency specification of the circuit board assembly in a gradual manner;
(b) performing at least one parametric test on the circuit board assembly supplied with the clock signal at the dynamically selected frequency, wherein the dynamically selected frequency is computed to exceed an operating frequency specification for the circuit board assembly; and
(c) determining if the circuit board assembly is an acceptable circuit board assembly based on the results of the at least one parametric.

13. The method of claim 12, wherein determining the operating frequency specification of the circuit board assembly comprises accessing circuit board assembly configuration information from a read-only memory (ROM).

* * * * *